US010605941B2

(12) United States Patent
Li et al.

(10) Patent No.: US 10,605,941 B2
(45) Date of Patent: Mar. 31, 2020

(54) METHODS FOR SIMULTANEOUS SOURCE SEPARATION

(71) Applicant: CONOCOPHILLIPS COMPANY, Houston, TX (US)

(72) Inventors: Chengbo Li, Houston, TX (US); Chuck Mosher, Houston, TX (US); Leo Ji, Houston, TX (US); Joel Brewer, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 33 days.

(21) Appl. No.: 14/974,060

(22) Filed: Dec. 18, 2015

(65) Prior Publication Data

US 2017/0082761 A1 Mar. 23, 2017

Related U.S. Application Data

(60) Provisional application No. 62/093,791, filed on Dec. 18, 2014.

(51) Int. Cl.
*G01V 1/36* (2006.01)
*G01V 1/28* (2006.01)

(52) U.S. Cl.
CPC .............. *G01V 1/368* (2013.01); *G01V 1/282* (2013.01); *G01V 1/364* (2013.01); *G01V 2210/127* (2013.01); *G01V 2210/57* (2013.01)

(58) Field of Classification Search
CPC ........ G01V 1/282; G01V 1/364; G01V 1/368; G01V 2210/127; G01V 2210/57
USPC ........................................................ 702/17
See application file for complete search history.

(56) References Cited

U.S. PATENT DOCUMENTS

| 5,724,306 | A | * | 3/1998 | Barr | ..................... | G01V 1/3808 181/110 |
| 8,559,270 | B2 | | 10/2013 | Abma | | |
| 2010/0299070 | A1 | * | 11/2010 | Abma | .................... | G01V 1/005 702/14 |
| 2011/0317517 | A1 | * | 12/2011 | Borresen | .............. | G01V 1/3808 367/21 |
| 2014/0146638 | A1 | * | 5/2014 | Renaud | ................ | G01V 1/3808 367/15 |

(Continued)

FOREIGN PATENT DOCUMENTS

WO 2014057440 7/2014

OTHER PUBLICATIONS

International Search Report for parent case, App. No. PCT/US15/066625, dated Mar. 29, 2016.

(Continued)

*Primary Examiner* — Duy T Nguyen
(74) *Attorney, Agent, or Firm* — Polsinelli PC (57) ABSTRACT

A multi-stage inversion method for deblending seismic data includes: a) acquiring blended seismic data from a plurality of seismic sources; b) constructing an optimization model that includes the acquired blended seismic data and unblended seismic data; c) performing sparse inversion, via a computer processor, on the optimization model; d) estimating high-amplitude coherent energy from result of the performing sparse inversion in c); e) re-blending the estimated high-amplitude coherent energy; and f) computing blended data with an attenuated direct arrival energy.

20 Claims, 7 Drawing Sheets

(56) References Cited

U.S. PATENT DOCUMENTS

| | | | |
|---|---|---|---|
| 2014/0303898 A1* | 10/2014 | Poole | G01V 1/003 702/17 |
| 2015/0124560 A1 | 5/2015 | Li et al. | |
| 2015/0272506 A1* | 10/2015 | Childs | A61B 8/5207 702/189 |

OTHER PUBLICATIONS

Wang et al., "Distributed Reconstruction via Alternating Direction Method," in Computational 3,9, 15 and Mathematical Methods in Medicine, vol. 2013, Article ID 418747, Hindawi Publishing Corporation, 2013.

Li et al, "Joint Source Deblending and Reconstruction for Seismic Data", SEG Houston 2013 Annual Meeting, pp. 82-88.

Baraniuk, Richard—"Compressive Sensing", 2007—Rice University Lecture Notes in IEEE Signal Processing Mazazine, vol. 24, Jul. 2007, pp. 1-9; 9 pgs.

Barzilai, Jonathan, et al—"Two-Point Step Size Gradient Methods", 1988, IMA Journal of Numerical Analysis, vol. 8, pp. 141-148, Oxford University Press; 9 pgs.

Candes, Emmanuel, et al—"Sparsity and Incoherence in Compressive Sampling", 2006, Applied and Computational Mathematics, Caltech, Pasadena, CA 91125 and Electrical and Computer Engineering, Georgia Tech, Atlanta, GA 90332, Nov. 2006; 20 pgs.

Li, Chengbo, et al—"Marine Towed Streamer Data Reconstruction Based on Compressive Sensing", 2013, SEG Houston 2013 Annual Meeting; DOI http://dx.doi.org/10.1190/segam2013-0401.1; 6 pgs.

Li, Chengbo, et al—"Interpolated Compressive Sensing for Seismic Data Reconstruction", 2012, SEG Technical Program Expanded Abstracts; pp. 1-6; 9 pgs, https://doi.org/10.1190/segam2012-1335.1.

Mosher, C.C., et al—"Non-Uniform Optimal Sampling for Seismic Survey Design", 2012, EAGE Meeting, Conference and Exhibition, Copenhagen, Denmark, 5 pgs.

Mosher, Charles C.—"Generalized Windowed Transforms for Seismic Processing and Imaging", 2012 annual SEG meeting Las Vegas Nevada Nov. 4-9, One Petro, SEG-2012-1196, Published by Society of Exploration Geophysicists; 4 pgs.

Zhang, Hongchao, et al—"A Nonmonotone Line Search Technique and Its Application to Unconstrained Optimization", 2004, Society for Industrial and Applied Mathematics, vol. 14, No. 4, pp. 1043-1056; 14 pgs.

\* cited by examiner

METHODS FOR SIMULTANEOUS SOURCE SEPARATION

PRIORITY CLAIM

This application is a non-provisional application which claims benefit under 35 USC § 119(e) to U.S. Provisional Application Ser. No. 62/093,791 filed Dec. 18, 2014, entitled "METHODS FOR SIMULTANEOUS SOURCE SEPARATION," which is incorporated herein in its entirety.

FIELD OF THE INVENTION

The present invention relates generally to seismic data acquisition. More particularly, but not by way of limitation, embodiments of the present invention include tools and methods for deblending and reconstructing seismic data acquired by simultaneous source technology.

BACKGROUND OF THE INVENTION

Simultaneous shooting of seismic sources makes it possible to sample a subsurface region more effectively and efficiently. During simultaneous source shooting, multiple sources can be activated inside a single conventional shot-point time window. Benefits of firing multiple shots within a short time period include shortening overall acquisition time and increasing spatial sampling bandwidth. However, energy from any individual shot can interfere with energy from time-adjacent shots, which allows sources to interfere with each other and generate blending noise. Thus, major technical challenges of simultaneous source shooting include separating sources ("deblending") and forming interference-free records. In general, deblending problem is underdetermined, requiring extra assumptions and/or regularization to obtain a unique solution.

In recent years, compressive sensing (CS) theory has seen some adoption within the oil and gas industry. Applications of CS theory can significantly broaden seismic data bandwidth and reduce seismic acquisition cost. While traditional seismic exploration methods rely on higher fold to improve data quality, compressive sensing provides a method for recovering coarsely sampled data. CS is an emerging field in signal processing, which requires much fewer measurements compared to Shannon's sampling criterion (Candes et al., 2006; Baraniuk, 2007). CS theory suggests that successful signal recovery can be best achieved through random measurements together with sparsity of true signal.

BRIEF SUMMARY OF THE DISCLOSURE

The present invention relates generally to seismic data acquisition. More particularly, but not by way of limitation, embodiments of the present invention include tools and methods for deblending and reconstructing seismic data acquired by simultaneous source technology.

One example of a multi-stage inversion method for deblending seismic data includes: a) acquiring blended seismic data from a plurality of seismic sources; b) constructing an optimization model that includes the acquired blended seismic data and unblended seismic data; c) performing sparse inversion, via a computer processor, on the optimization model; d) estimating high-amplitude coherent energy from result of the performing sparse inversion in c); e) re-blending the estimated high-amplitude coherent energy; and f) computing blended data with an attenuated direct arrival energy.

Another example of a multi-stage inversion method for deblending seismic data includes: a) acquiring blended seismic data from a plurality of seismic sources; b) constructing an optimization model that includes the acquired blended seismic data and unblended seismic data; c) performing sparse inversion, via a computer processor, on the optimization model; d) estimating a high-amplitude noise selected from the group consisting of: direct arrival energy, ground roll, and mud roll; e) re-blending the estimated high-amplitude noise; f) computing blended data with an attenuated direct arrival energy; and g) iteratively repeating steps c) to f) until a desired blended data is computed.

One example of a method for jointly deblending and reconstructing seismic data includes: a) acquiring blended seismic data from a plurality of seismic sources; b) constructing an optimization model that includes the acquired blended seismic data, unblended seismic data, and a restriction operator that maps data from a grid of reconstructed seismic sources to a grid of observed seismic sources; and c) performing sparse inversion, via a computer processor, on the optimization model.

One example a multi-stage inversion method for jointly deblending and reconstructing seismic data includes: a) acquiring blended seismic data from a plurality of seismic sources; b) constructing a jointly deblending and reconstruction optimization model that includes the acquired blended seismic data, unblended seismic data, and a restriction operator that maps data from a grid of reconstructed seismic sources to a grid of observed seismic sources; c) performing sparse inversion, via a computer processor, on the jointly deblending and reconstruction optimization model; d) estimating a high-amplitude noise selected from the group consisting of: direct arrival energy, ground roll, and mud roll; e) interpolating estimation of the high-amplitude noise to actual acquired locations; f) re-blending the estimated high-amplitude noise; g) computing blended data with an attenuated direct arrival energy; and h) iteratively repeating steps c) to f) until a desired blended data is computed.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

The present invention provides tools and methods for iteratively eliminating blending noise ("deblending") from simultaneous source technology and reconstructing interference-free records using multi-stage inversion. In some embodiments, the deblending and reconstructing can be performed at the same time (jointly). Jointly solving for deblended and reconstructed data has several advantages over simply deblending followed by reconstructing, which in turn, improves behavior of optimization problem. These advantages include, but are not limited to, improved deblending quality, increased seismic data bandwidth, greater ability to handle complex field data, and the like.

Moreover, joint inversion can benefit simultaneous survey design. Currently, time dithering is a key factor for deblending procedures. With appropriate time dithering, competing shots become incoherent in, for example, common receiver and common depth point (CDP) domains. In order to obtain time dithering together with traditional regular shot spacing, it is necessary to assume variable boat speed from one shot point to another. However, precisely changing boat speed is difficult to achieve in practice. Joint inversion allows the constraint of regular shot spacing to be dropped and keeps the boat shooting on predefined time intervals or locations without changing the speed.

The invention will be described in greater detail by way of specific examples. The following examples are offered for illustrative purposes, and are not intended to limit the invention in any manner. Those of skill in the art will readily recognize a variety of noncritical parameters which can be changed or modified to yield essentially the same results.

The embodiments disclosed in Examples 1 may be practice alone or in combination with embodiments disclosed in Example 2 (and vice versa) to provide a method of jointly deblending and reconstructing data using multi-stage inversion in order to improve deblending and separation.

EXAMPLE 1

Sparse Inversion by Nonmonotone Alternating Direction Method

A multi-stage inversion method has been developed to overcome certain issues encountered with field blended data. The method strips out a particular portion of energy from blended records at each stage of deblending process. Residue energy is fed back to an inversion engine and moved to the next stage. This method combines conventional processing flows with sparse inversion and generates a more powerful target-oriented deblending approach.

A matrix-vector notation is used to describe a seismic data model, $$b = Mu, \quad x = Su. \tag{1}$$

Here b is the acquired blended data, and u is the unblended data without source interference. Each seismic trace in u records energy from a single seismic source while b is a continuous record which contains all sources within a period of time. In additional, M is a blending operator which contains timing information to describe the overlaps of sources, and S is a suitably chosen, possibly over-complete, dictionary (e.g., a transform, sparsity basis, etc.) such that x will have small cardinality. Additionally, another restriction operator (described later in Example 2) can be plugged to describe relation between irregular shot locations in the field and desired regular locations after inversion, which can lead to a joint deblending and reconstruction scheme.

In order to obtain the unique solution from the underdetermined system shown in equation 1, an analysis-based basis pursuit denoising problem is solved, $$\min_u \|Su\|_1 \quad \text{s.t.} \quad \|Mu - b\|_2 \leq \sigma, \tag{2}$$

where σ is approximation of white noise level in acquired data b, excluding the blending noise.

Nonmonotone Alternating Direction Method

Optimization model, shown in equation 2, can be effectively and efficiently solved by a nonmonotone alternating direction method (ADM) as described in Li et al. (2013b). The ADM method has been well researched and widely used for decades as a robust iterative method solving inverse problems. Nonmonotone line search relaxes standard line search conditions and enables iterative methods to approach the true solution quickly.

The ADM method starts with introducing splitting variables into equation 2 to separate non-differentiable $l_1$ part from rest differentiable part. Then it minimizes a corresponding augmented Lagrangian function with respect to each variable in an alternation way. Nonmonotone line search helps accelerate overall convergence.

We introduce splitting variables $w = Su$ and $v = Mu - b$. The goal of splitting is to separate the non-differentiable part from the differentiable and simplify the inequality constraints in equation 2. Therefore, equation 2 is equivalent to, $$\min_{u,w,v} \|w\|_1 \quad \text{s.t.} \quad w = Su, \; v + b = Mu, \; \|v\|_2 \leq \sigma \tag{3}$$

Ignoring $l_2$-ball constraint ($\|v\|_2 \leq \sigma$), its corresponding augmented Lagrangian function can be written as, $$\mathcal{L}_A(w,u,v) = \|w\|_1 - \gamma^*(Su - w) + \beta/2\|Su - w\|_2^2 - \lambda^*(Mu - b - v) + \mu/2\|Mu - b - v\|_2^2 \tag{4}$$

where γ and λ are multipliers, and β and μ are penalty parameters. Minimum of the convex model in equation 3 can be obtained by alternately minimizing the augmented Lagrangian function in equation 4 and updating multipliers.

The problem can be divided into three subproblems corresponding to u, v and w, respectively, which can be solved in an alternating fashion. For constant u and v, the w-subproblem is, $$\min_w \left\{ \|w\|_1 - \gamma^*(Su - w) + \frac{\beta}{2}\|Su - w\|_2^2 \right\} \tag{5}$$

Equation 6 is separable with respect to each $w_i \in w$ and has the closed-form solution, $$\tilde{w} = \max\left\{ \left\|Su - \frac{\gamma}{\beta}\right\|_1 - \frac{1}{\beta}, 0 \right\} \mathrm{sgn}\left(Su - \frac{\gamma}{\beta}\right) \tag{6}$$

where sgn(x) is 1 for x>0, 0 for x=0, and −1 for x<0.

For constant w and u, the v-subproblem is, $$\min_v \left\{-\lambda^*(Mu-b-v) + \frac{\mu}{2}\|Mu-b-v\|_2^2\right\} \text{ s.t.} \quad (7)$$

$$\|v\|_2 \leq \sigma$$

The value of v found from solving equation 7 is equivalent to that found from solving, $$\min_v \left\|(Mu-b-v) - \frac{\lambda}{\mu}\right\|_2^2 \text{ s.t. } \|v\|_2 \leq \sigma \quad (8)$$

Further, if we let, $$\theta = Mu - b - \lambda/\mu \quad (9)$$

then the explicit solution of equation 8 becomes, $$\tilde{v} = \begin{cases} \theta, & \text{if } \|\theta\|_2 \leq \sigma \\ \frac{\sigma\theta}{\|\theta\|_2}, & \text{otherwise} \end{cases} \quad (10)$$

For constant w and v, the u-subproblem is, $$\min_v \psi(u) = \quad (11)$$

$$\left\{-\gamma^*(Su-w) + \frac{\beta}{2}\|Su-w\|_2^2 - \lambda^*(Mu-b-v) + \frac{\beta}{2}\|Mu-b-v\|_2^2\right\}$$

Equation 11 is differentiable and quadratic, with the corresponding normal equations, $$(\beta S^*S + \mu M^*M)\tilde{u} = S^*(\beta w + \gamma) + R^*(\mu b + \mu v + \lambda) \quad (12)$$

If inverting A*A is not straightforward, another iterative solver is needed to solve equation 12, which is computationally intensive. An approximation can be obtained by taking only one steepest descent step with aggressive step length; i.e., $$\tilde{u} = u + \alpha d \quad (13)$$

where d is a descent direction and α is the step length. In order to achieve a satisfactory iteration, we initialize the step length using the well-known Barzilai and Borwein (BB) method (Barzilai and Borwein, 1988) and backtrack until the nonmonotone Armijo condition (Zhang and Hager, 2004), $$\psi(u+\alpha d) \leq C + \delta\alpha\nabla\psi(u)^T d \quad (14)$$

is satisfied. Here δ is some constant close to 0 which determines amount of reduction, and C is a linear combination of all previous function values. Specifically, C is updated to ensure convergence, $$\tilde{Q} = \eta Q + 1, \tilde{C} = (\eta QC + \psi(\tilde{u}))/\tilde{Q} \quad (15)$$

Here η≥0 controls the degree of nonmonotonicity. Specifically, the line search becomes monotone if η=0. The larger η is, the more aggressive the algorithm is allowed to be.

Multi-Stage Inversion

By employing the nonmonotone ADM, first approximation of unblended data u can be obtained;

$$u_1 = \underset{u}{\operatorname{argmin}}\|Su\|_1 \text{ s.t. } \|Mu-b\|_2 \leq \sigma \quad (16)$$

In many cases, direct application of nonmonotone ADM yields high-fidelity deblending results. In some field situations, however, a single pass of nonmonotone ADM is inadequate. In field areas where the first break or surface wave energy is orders of magnitude stronger than the reflected energy, it is possible that $u_1$ still contains noticeable blending noise residue. Several reasons can cause unavoidable errors for sparse inversion. For example, the assumption of sparsity may not strictly hold for complex geometry and/or presence of noise.

The nature of sparse inversion indicates the method tends to fit coherent high-amplitude energy first since it will give smaller $l_2$ misfit under the same sparsity level. Therefore, the portion corresponding to the high-amplitude energy in $u_1$ is more reliable. Conventional processing workflow can be applied to deblended records $u_1$ to estimate coherent high-amplitude energy, for example, direct arrival energy. The estimate is denoted as $p_1$. Re-blending $p_1$ based on source time information and subtract from acquired data;

$$b_1 = b - Mp_1 \quad (17)$$

$b_1$ can, in fact, be interpreted as the blended data with an attenuated direct arrival. This type of first-break attenuation could not be applied directly to the blended continuous record b, due to simultaneous source interference.

At the next stage, we feed $b_1$ for sparse inversion which is much less affected by direct arrival energy and potentially leads to higher fidelity of deblending.

$$u_2 = \underset{u}{\operatorname{argmin}}\|Su_1\| \text{ s.t. } \|Mu-b_1\|_2 \leq \sigma \quad (18)$$

Figure 1:
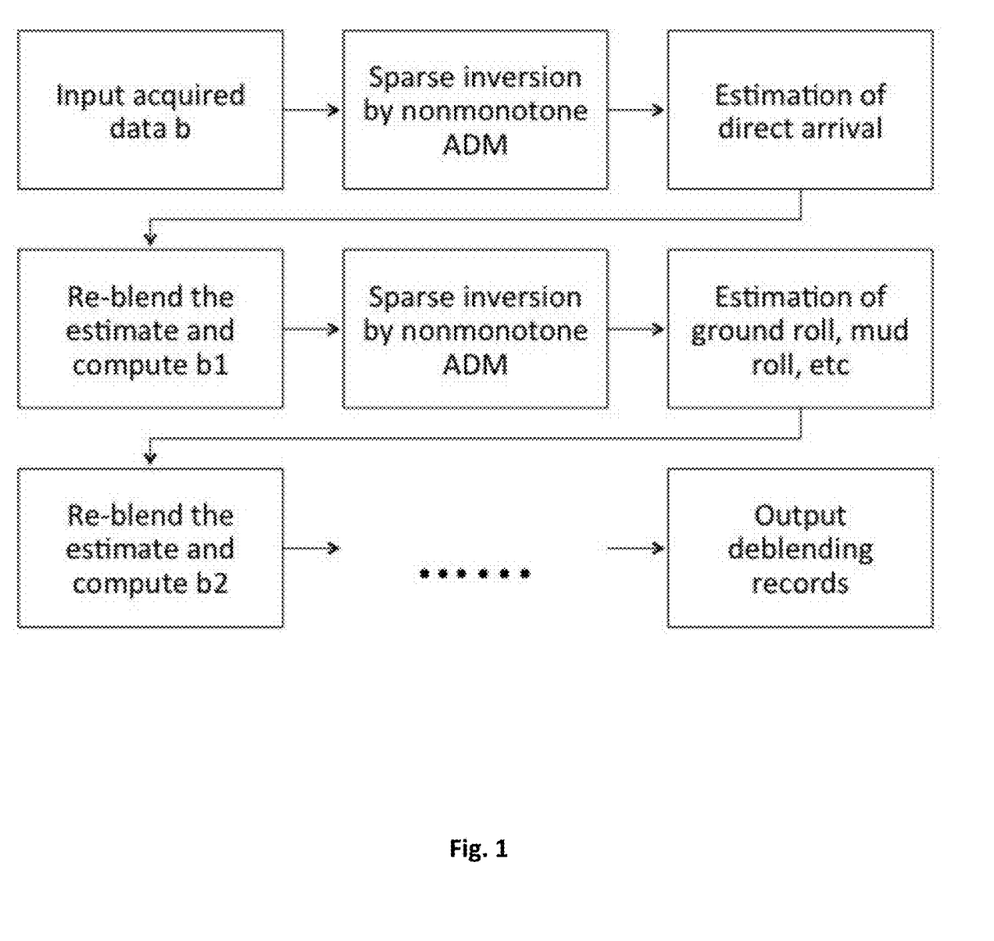
FIG. 1 illustrates flow chart of multi-stage inversion method as described in Examples.

Similarly, a target-oriented processing flow can be employed to isolate ground roll, mud roll, or other high-amplitude coherent noise from $u_2$, and blend and subtract that portion of energy from $b_1$ for another round of sparse inversion. In some embodiments, this method can be extended to include multiple passes over the blended data, as shown in FIG. 1, in order to suppress first break followed by successively weaker modes of coherent noise until a high-fidelity deblending is obtained.

Estimation of direct arrival, ground roll or mud roll at each stage does not need to be accurate, as long as the estimate is coherent. It may be sufficient to attenuate unwanted high-amplitude energy in the blended data and make sparse inversion more favorable for weaker events. Coherency of seismic events should be preserved in the process of attenuation at each stage. Deblending results by sparse inversion should be significantly improved after eliminating the direct arrival energy, and deblending quality will meet the requirements of time-lapse or amplitude versus offset (AVO) analysis after two to three stages.

Simultaneous Source Survey

A 3D ocean-bottom cable survey was conducted over a production field. Receiver patch was composed by 12 cables with 300 m cable spacing. Each cable was 10 km long while receivers along each cable were 25 m apart. Source vessel equipped with a single source sailed in an orthogonal direction and fired every 25 m. Each patch contained 50 sail lines and took approximately 8 days to shoot production survey (including downtime and in-fill shooting). In order to de-risk the simultaneous source technology and address the potential issues in the field, the last patch of this survey was re-designed and re-shot using two source vessels simultaneously. This was repeated for the same 50 sail lines and each vessel covered one half of the survey area (25 lines).

Figure 2:
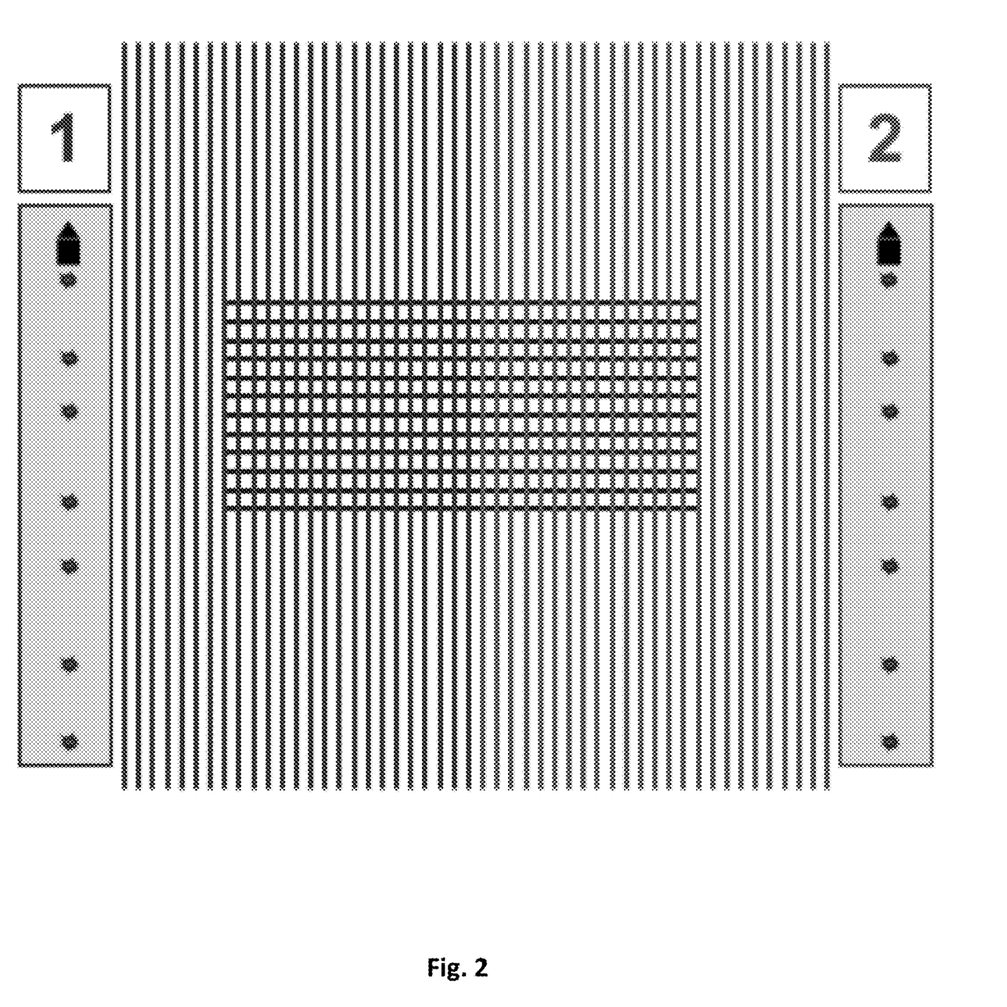
FIG. 2 illustrates geometry of simultaneous source survey as described in Examples.

As shown in FIG. 2, red lines were covered by boat 1 and green lines were covered by boat 2. In an effort to make a fair comparison, the same number of shots was planned for each sail line, but the inline locations were designed using the non-uniform optimal sampling method. The advantage of adopting a non-uniform shot spacing is that source time will be incoherent without manipulating boat speed and both vessels can shoot independently. It minimizes operational complexity in the field. Additionally, both source vessels were sped up from 3.8 knots for the production survey to 4.2 knots for simultaneous source survey. The faster vessel speed would cause so-called "self-blending", referring to the phenomena of adjacent shots from same source vessel interfering with each other. The self-blending energy will also be deblended in the process of multi-stage inversion. The simultaneous source survey took 3.5 days to finish the last patch (including the downtime and in-fill shooting), which 1 d to 55% overall shooting time reduction comparing to the production survey.

Figure 3A:
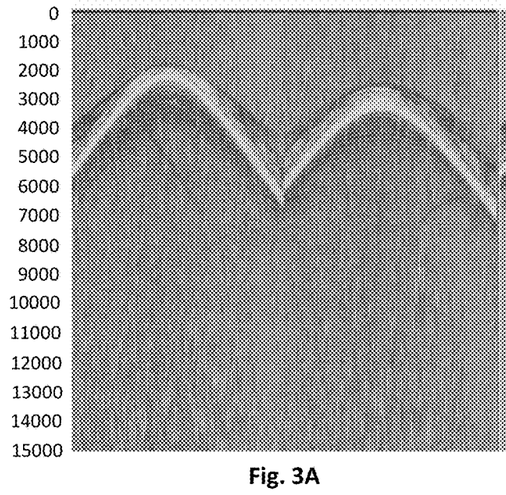
FIGS. 3A-3D illustrate deblending results from two-stage inversion as described in the Examples.
Figure 3B:
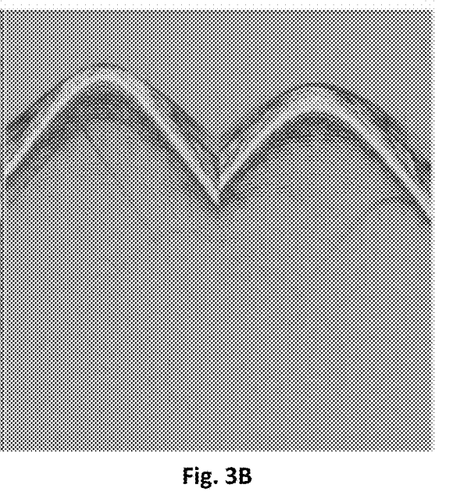
Figure 3C:
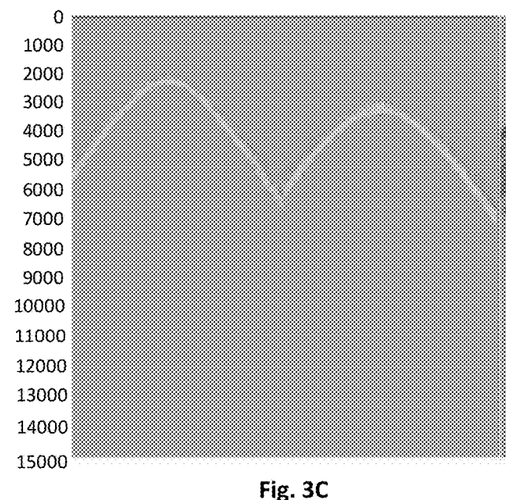
Figure 3D:
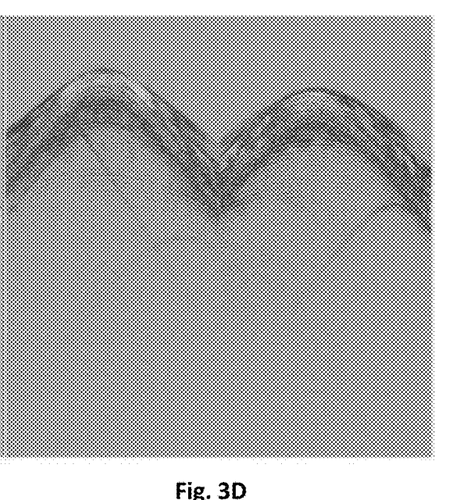

FIGS. 3A-3D illustrate a two-stage inversion process from the simultaneous source data, in which each quadrant (3A, 3B, 3C, 3D) corresponds to a particular step shown in FIG. 1. In each quadrant, display includes same two lines of shots from two source vessels into a fixed receiver. As shown, FIG. 3A shows pseudo-deblended records, which refer to simply applying adjoint of blending operator to continuous data. The pseudo-deblended records can be interpreted as another way to visualize the blended data, on which the blending noise will show up as incoherent energy on top of the coherent seismic events. As shown, FIG. 3B illustrates the inversion result from raw blended data using the nonmonotone ADM. A generalized windowed Fourier transform (Mosher, 2012) was adopted as sparsity basis. Records after a direct inversion is fairly good, considering no processing has been applied beforehand. Nevertheless, some blending noise has leaked through especially in the deep section. As shown, FIG. 3C illustrates the estimate of direct arrival from first stage deblended data. After using this estimate to attenuate the corresponding high-amplitude energy in raw blended data, updated blended data was inputted for second stage sparse inversion. As shown, FIG. 3D illustrates the deblended records after second stage inversion using nonmonotone ADM. Comparing the results between two-stage inversion and previous raw data inversion, less amount of blending noise leaked through and more consistent seismic events were observed. Moreover, records to 15 seconds after deblending were retained, instead of 12 seconds for production survey. One goal of this survey was to retain long records for further converted wave analysis. After this stage, level of blending noise leaking though should be well below background noise, and conventional processing and imaging workflows should follow.

Figure 4:
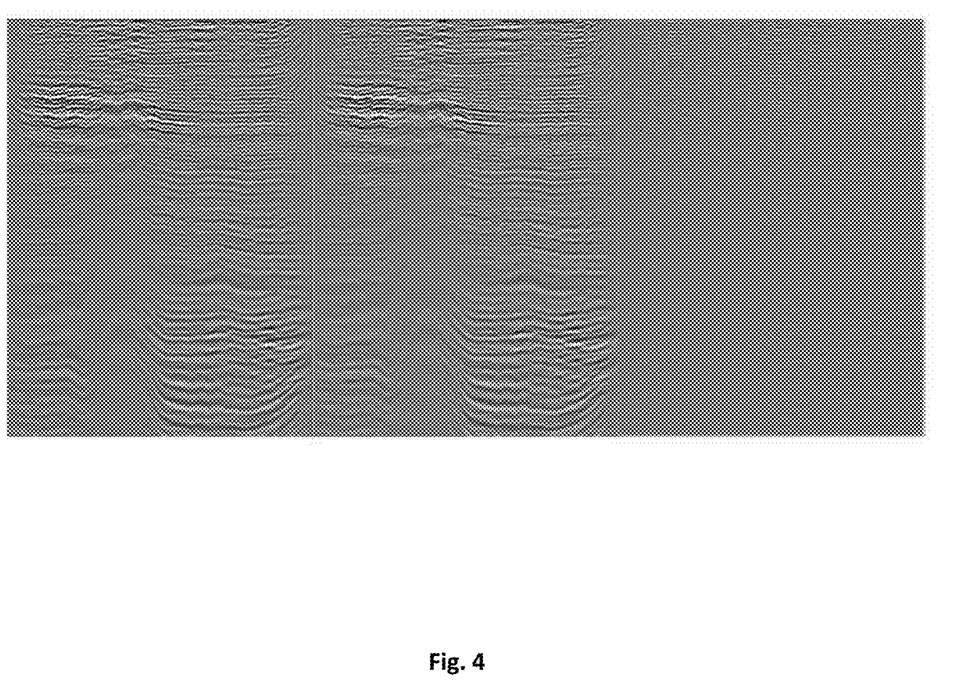
FIG. 4 illustrates stacks and difference plot as described in Examples.

FIG. 4 shows stacked section after reverse time migration (RTM) has been applied to both single source production data and simultaneous source data. In an effort to draw a fair conclusion, both data sets have been through same processing flow, with very similar parameter settings. Maximum frequency for RTM is 45 Hz. Left and middle panels of FIG. 4 show the stacks over a same inline from simultaneous source data and production data, respectively. Right panel plots differences between two stacks. As shown, differences of imaging from two surveys are minimal and quality for interpretation is equally good. Shallow section tends to have bigger difference, which is caused by mismatch between shot locations of two surveys. Simultaneous source survey was specifically designed to have non-uniform shot spacing while production survey was regular. The difference in shallow section could be potentially reduced by applying regularization technique to simultaneous source data. Further calculation of normalized RMS value indicates the technology is suitable for AVO and time-lapse analysis.

EXAMPLE 2

This example describes a joint source blending and data reconstruction model, which is then incorporated into a synthesis-based basis pursuit optimization model. In turn, this optimization model is augmented to include weights that penalize the evanescent portion of the wavefield.

By applying a restriction operator followed by a deblending operator, the joint source deblending and data reconstruction model is given by, $$b=MRu, \quad x=Su, \tag{19}$$

where b is the acquired blended data, and u is the reconstructed and deblended data on a regular grid. Each seismic trace in u records energy from a single reconstructed seismic source. R is a restriction operator that maps data from a grid of reconstructed seismic sources to a grid of observed seismic sources, and M is a blending operator that blends energy from multiple sources into one trace for each receiver (i.e., a continuous record). More specifically, operator R is constructed using only spatial information by means of, for example, interpolated compressive sensing (reference: Li, C., C. C. Mosher, and S. T. Kaplan, 2012, Interpolated compressive sensing for seismic data reconstruction: SEG Expanded Abstracts.), while operator M is constructed using only timing information. S may be a suitably chosen, possibly over-complete, dictionary such that x will have small cardinality.

The blended data acquisition allows for, in some sense, random compression of the recorded data and the acquisition time. One consequence of this compression is that the model in equation 19 is underdetermined. This statement is true regardless of whether or not S is an over-complete dictionary. This random compression enables application of compressive sensing methodology and employs an efficient deblending and reconstruction algorithm.

Based on the joint model shown as the underdetermined system in equation 19, compressive sensing techniques can be incorporated to recover the reconstructed and deblended data u by solving an analysis-based basis pursuit denoising problem, $$\min_u \|Su\|_1 \text{ s.t. } \|MRu - b\|_2 \leq \sigma, \tag{20}$$

where σ represents the noise level in the observed data b.

In equation 19, the reconstructed data u is in common receiver domain. The wavefield is evanescent when the source side vertical wavenumber $k_{sz}$ is imaginary, and where, $$k_{sz} = \sqrt{\frac{\omega}{c_0} - k_{sx}^2} \tag{21}$$

In equation 21, $k_{sx}$ is the wavenumber corresponding to the source position in common receiver domain, $\omega$ is the angular temporal frequency, and $c_0$ can be the water velocity (1480 m/s). A variation on the optimization model in equation 20 can reject the evanescent portion of the recorded wavefield. The dispersion relation could be used to build a weighting operator W, $$W = F^* \Lambda F, \quad (22)$$

where F is the two dimensional Fourier transform, and $\Lambda^{-1}$ is a diagonal matrix such that its $i^{th}$ diagonal element corresponds to a given realization of $k_{sx}$ and $\omega$, and is, $$[\Lambda]_{ii} = \begin{cases} 0, & k_{sz} \text{ is imaginary} \\ 1, & k_{sz} \text{ is real} \end{cases} \quad (23)$$

With the weights defined in equations 22 and 23, another operator is incorporated into equation 7. An alternative optimization model is derived, $$\min_u \|SW^{-1}u\|_1 \text{ s.t. } \|MRu - b\|_2 \le \sigma, \quad (24)$$

Equation 11 can be simplified via change of variables, $$z = W^{-1}u, A = MRW,$$

so that it becomes, $$\min_u \|Sz\|_1 \text{ s.t. } \|Az - b\|_2 \le \sigma, \quad (25)$$

The optimization model in equation 25 can be effectively and efficiently solved by a nonmonotone alternating direction method (nonmonotone ADM) described in Example 1.

Compressive sensing provides conditions for successful recovery of the traditional common receiver gather on the grid of reconstructed seismic sources (u in equation 19), given irregularly sampled observed data (b in equation 19). One prerequisite of these theorems is that the smaller the cardinality of Su, the more likely it will be recovered successfully. This motivates inclusion of the restriction operator in the model. In general, unaliased or finely sampled data tend to have smaller cardinality. The inclusion of the restriction operator R in the optimization model allows for a suitably sampled source dimension in u, even when the acquisition grid is coarse and irregular. In other words, there may be a benefit of performing joint deblending and data reconstruction, rather than deblending followed by data reconstruction.

2D Synthetic Marmousi Model

The following illustrates an application to a 2D synthetic Marmousi velocity model. Synthetic data was obtained by sampling wavefield generated by a finite difference method to receiver locations, based on acoustic wave equations. The receivers have fixed positions and record continuously.

Results for two synthetic Ocean Bottom Seismic (OBS) experiments are described. First, a regular observed grid of seismic sources was used to test effect of utilizing weights W in the optimization model in equation 25. Second, an irregular observed grid of seismic sources was used to test the effect of the restriction operator R in the same optimization model. In both cases, operator S was allowed be the curvelet transform.

In the first experiment, the receivers were stationary and recorded continuously for approximately 37 minutes. A single source boat was used and 737 shots were simulated. Each shot fired with 2 to 4 seconds delay after previous shot, and time samples were realized from a uniform random process. Further, spacing between adjacent shot locations were constant with a shot spacing of 12.5 m, and data was recorded at 132 receivers spaced every 25 m.

Figure 5A:
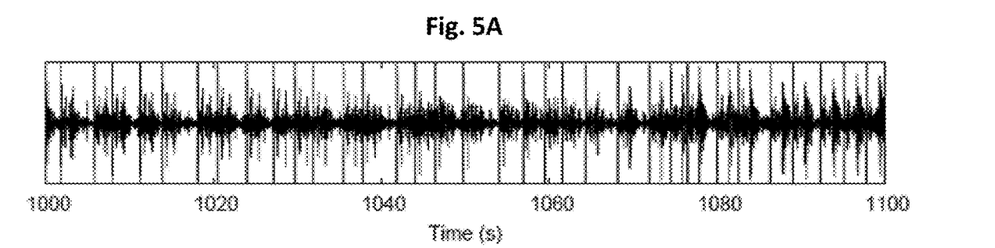
FIGS. 5A-5E illustrate deblending results for a regular acquisition grid as described in Examples.
Figure 5B:
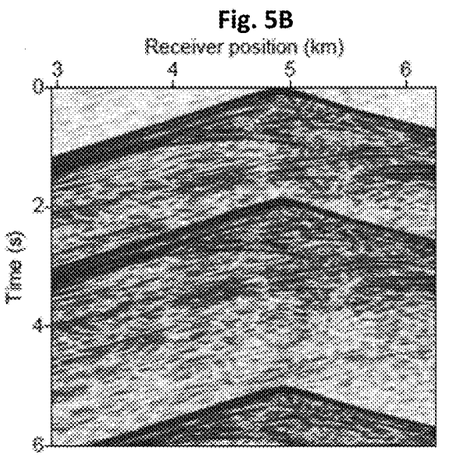
Figure 5C:
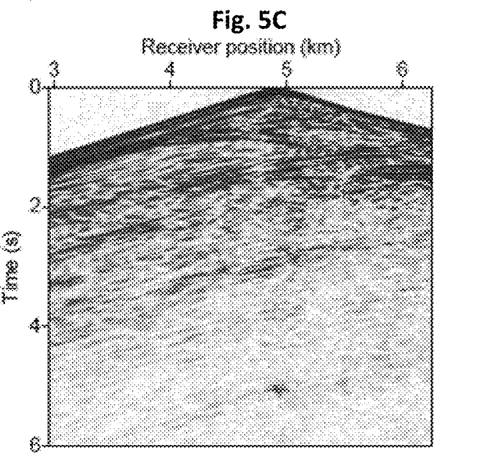
Figure 5D:
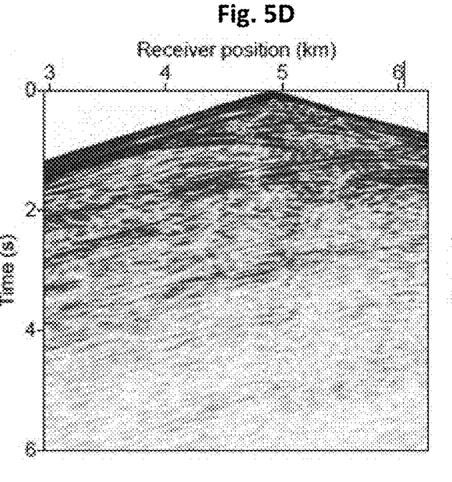
Figure 5E:
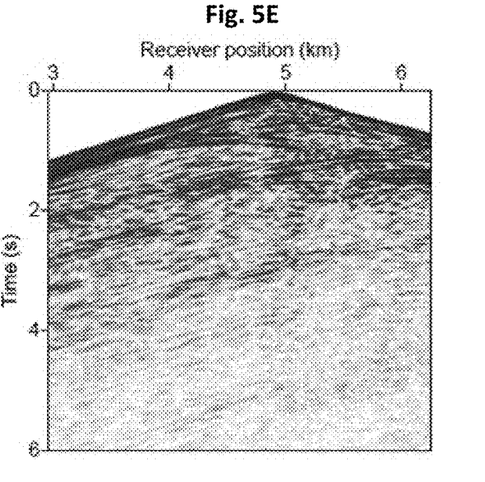

FIG. 5A shows a subset of the data b recorded from the experiment for a single receiver. For each receiver gather, it is assumed that the traditional data u have a recording duration of 6 seconds for each of the 737 sources. For each receiver u has 74 minutes of recordings, compared to 37 minutes of recordings for b, making b compressed compared to u. FIG. 5b shows result of applying the adjoint to each receiver position M*b, which is often referred as "pseudo-deblending" process. Likewise, FIG. 5c shows the solution by solving the optimization model in equation 20 (without the weighting operator W), but with R=I. FIG. 5d shows the solution by solving the optimization model in equation 25 (with the weighting operator W), again, with R=I. For reference, FIG. 5e shows the true solution computed using finite difference modeling. The comparison indicates that the optimization model with the weighting operator provides a more reliable recovery of deblended data.

Figure 6A:
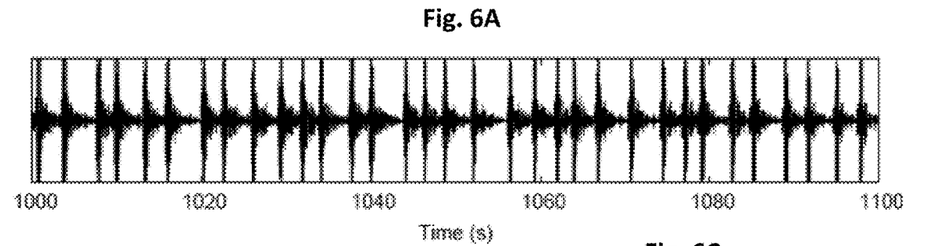
FIGS. 6A-6E illustrate deblending results for an irregular acquisition grid as described in Examples.
Figure 6B:
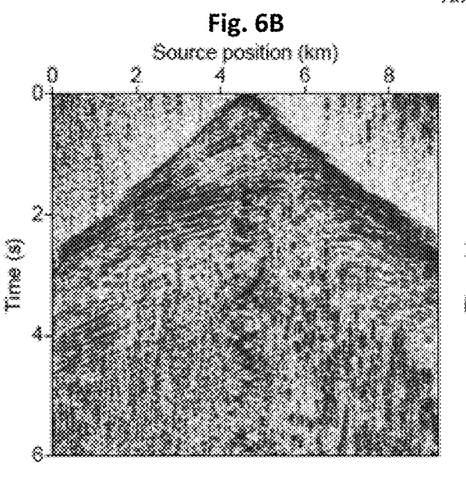
Figure 6C:
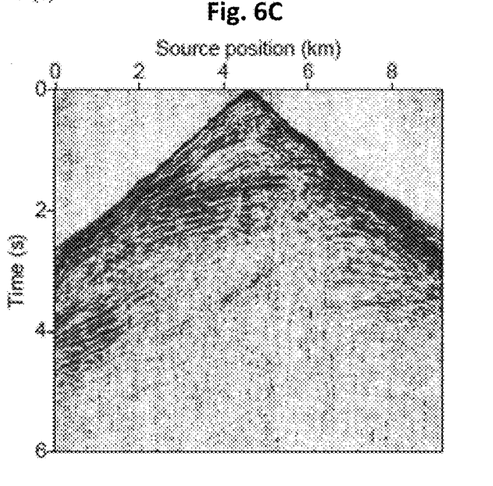
Figure 6D:
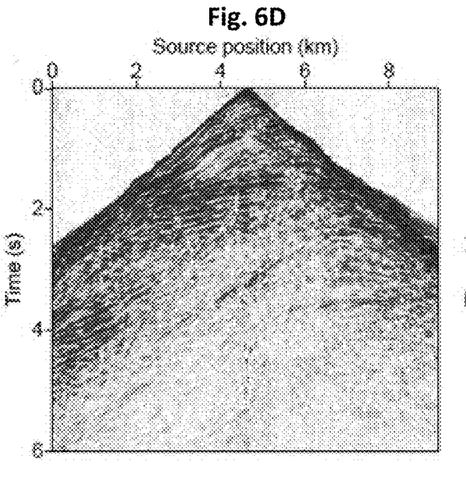
Figure 6E:
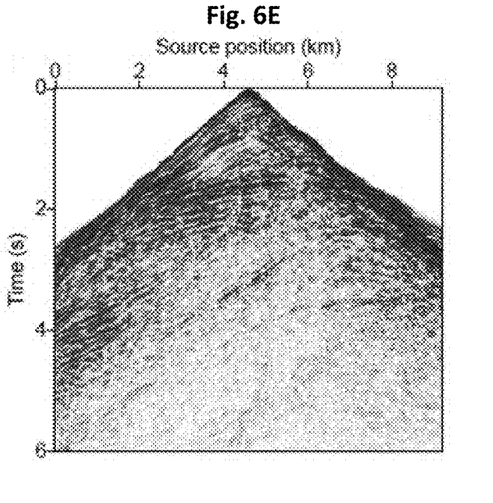

In the second experiment, an irregular observed grid in the source dimension is considered. The benefits of irregular source spacing are at least two-fold. First, it becomes possible to achieve irregular time delays between adjacent shots without requiring a change in boat speed. Second, it can increase the effective bandwidth of u and improve the spatial resolution with the same amount of shots. As before, a single source boat is assumed, in which shots are fired between 2 and 4 seconds. Further, 369 source positions are chosen randomly from an underlying grid with 12.5 m spacing (737 grid points). This set of 369 source positions are the observed grid of sources. Then, R maps from the underlying grid of sources to the observed grid of sources. FIG. 6a is a subset of the data b for one receiver, and FIG. 6b is the pseudo-deblended result. Finally, FIG. 6c shows results from solving the optimization model in equation 25 with R=I and R being the correct and appropriately chosen restriction operator (FIG. 6d). For reference, FIG. 2e is true traditional common receiver gather plotted on the observation grid. The signal-to-noise ratio of the result that does not use the restriction operator (FIG. 6c) is 12.5 dB, while the signal-to-noise ratio of the result that does use the restriction operator (FIG. 6d) is 22.7 dB. In summary, the optimization model with the correct restricted operator provides better reconstruction of the deblended data.

Field Data

For this field data example, data was collected with a two-dimensional OBN acquisition geometry. The survey was designed using Non-Uniform Optimal Sampling (NUOS) method as described in Mosher et al. (2012) with non-uniform shot spacing. The acquired data contained 774 shots with an average of 25 m spacing, and 560 receivers which were 25 m apart. A two-boat scenario (each boat covers half of the sail line) is synthesized by blending the first half of this data set with the second half. It was assumed that both boats maintained a constant boat speed of 2 m/s (3.9 knots). This type of survey design is easy to achieve in the field under multi-boat settings, and variation of boat speed due to natural causes will not affect, but possibly enhance, quality of joint deblending and reconstruction.

Figure 7A:
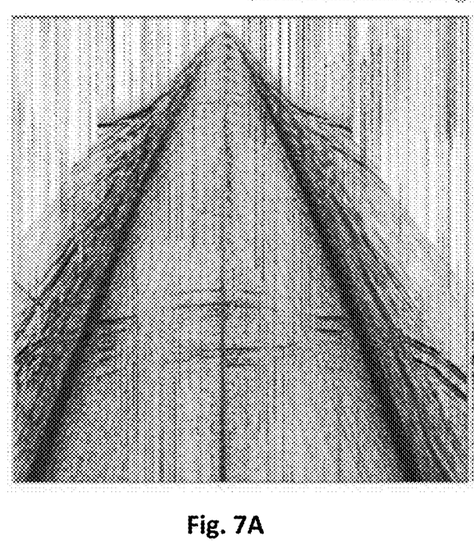
FIGS. 7A-7D illustrate real data deblending result for an irregular acquisition grid as described in Examples.
Figure 7B:
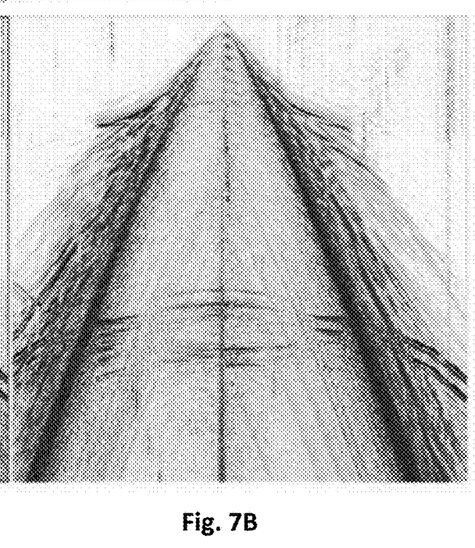
Figure 7C:
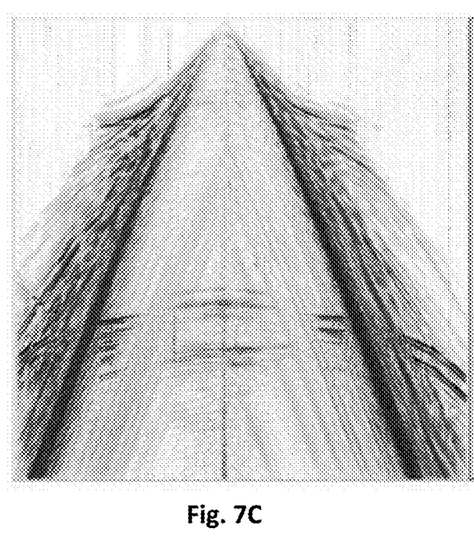
Figure 7D:
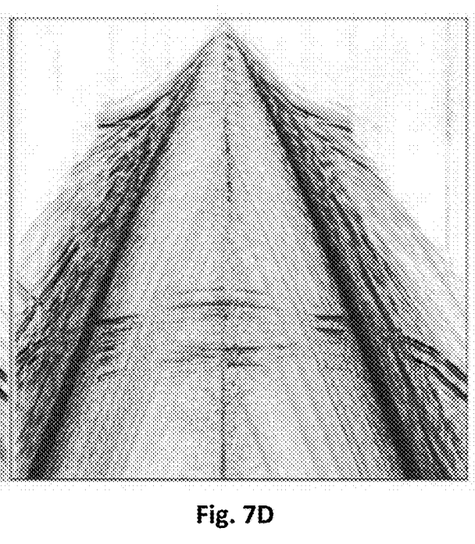

For deblending, operator S is chosen to be the curvelet transform. FIG. 7a shows the pseudo-deblended result, while FIGS. 7b-7d show the results from deblending only, deblending and reconstruction without weights, and deblending and reconstruction with weights cases, respectively. Deblending without reconstruction results (as shown in FIGS. 7a and 7b) contain 774 shot points with original irregular grid, but the joint deblending and reconstruction results (as shown in FIGS. 7c and 7d) contain 3096 shot points with a regular grid of 6.25 m. From the results, a gradual improvement from step to step can be seen, and the best result is achieved by appropriately using all three operators in the optimization model in equation 25. The joint blending and reconstruction not only deblended the data but also quadrupled the data fold and increased the effective data bandwidth.

The invention claimed is:

1. A multi-stage inversion method for deblending seismic data, the method comprising:
   a) acquiring, via a plurality of shots fired from at least one vessel, blended seismic data from a plurality of seismic sources using a compressive sensing sampling scheme, the at least one vessel driven at a constant speed while permitting natural causes to affect the constant speed;
   b) constructing an optimization model that relates the blended seismic data to unblended seismic data;
   c) performing sparse inversion, via a computer processor, on the optimization model to yield a result;
   d) estimating high-amplitude coherent energy from the result;
   e) re-blending the high-amplitude coherent energy; and
   f) computing a deblended seismic data by attenuating at least a portion of the high-amplitude coherent energy from the blended seismic data.

2. The method of claim 1, wherein steps c) to f) are iteratively repeated until a desired deblended data is computed.

3. The method of claim 1, wherein the sparse inversion is by nonmonotone alternating direction method.

4. The method of claim 1, wherein the optimization model is given by b=Mu, wherein b is the blended seismic data, u is the unblended seismic data, and M is a blending operator.

5. The method of claim 1, wherein performing the sparse inversion provides at least an approximation of the unblended seismic data u.

6. The method of claim 1, wherein the high-amplitude coherent energy is subtracted from the blended seismic data after performing the re-blending of the high-amplitude coherent energy.

7. The method of claim 1, where the high-amplitude coherent energy is selected from, the group consisting of: direct arrival energy, ground roll, mud roll, multiples, near-surface scattering, topographic scattering, noise generated by permafrost, platform, surveys nearby, and any combination thereof.

8. The method of claim 1, wherein the natural causes cause the at least one vessel to have a variable speed.

9. The method of claim 8, wherein the blended seismic data is acquired via a plurality of vessels.

10. The method of claim 8, wherein each of the plurality of vessels covers half of a survey area.

11. A multi-stage inversion method for deblending seismic data, the method comprising:
   a) acquiring, via a plurality of shots fired from at least one vessel, blended seismic data from a plurality of seismic sources using a compressive sensing sampling scheme, the at least one vessel driven at a constant speed while permitting natural causes to affect the constant speed;
   b) constructing an optimization model that relates the blended seismic data to unblended seismic data;
   c) performing sparse inversion, via a computer processor, on the optimization model;
   d) estimating a high-amplitude noise from the optimization model, the high-amplitude noise selected from the group consisting of: direct arrival energy, ground roll, and mud roll;
   e) re-blending the high-amplitude noise;
   f) computing deblended data by attenuating at least a portion of the high-amplitude noise from the blended seismic data; and
   g) iteratively repeating steps c) to f) until a desired deblended data is computed.

12. The method of claim 11, wherein the sparse inversion is by nonmonotone alternating direction method.

13. The method of claim 11, wherein the optimization model is given by b=Mu, wherein b is the blended seismic data, u is the unblended seismic data, and M is a blending operator.

14. The method of claim 11, wherein performing the sparse inversion provides at least an approximation of the unblended seismic data u.

15. The method of claim 11, wherein the high-amplitude noise is subtracted from the blended seismic data after performing the re-blending of the high-amplitude noise.

16. A method for jointly deblending and reconstructing seismic data, the method comprising:
   acquiring, via a plurality of shots fired from at least one vessel, blended seismic data from a plurality of seismic sources using a compressive sensing sampling scheme, the at least one vessel driven at a constant speed while permitting natural causes to affect the constant speed;
   constructing an optimization model that relates the blended seismic data, unblended seismic data, and a restriction operator that maps data from a grid of reconstructed seismic sources to a grid of observed seismic sources;
   performing sparse inversion, via a computer processor, on the optimization model, a high-amplitude energy being estimated from the optimization model, the high-amplitude energy being re-blended; and
   computing a deblended data by attenuating at least a portion of the high-amplitude energy.

17. The method of claim 16, wherein the blended seismic data is acquired by a non-uniform shooting pattern.

18. The method of claim 16, wherein the sparse inversion is by nonmonotone alternating direction method.

19. The method of claim 16, wherein the optimization model is given by b=MRu, wherein b is the blended seismic data, u is the unblended seismic data, M is a blending operator, and R is the restriction operator.

20. The method of claim 16, wherein the performing of the sparse inversion provides at least an approximation of the unblended seismic data u.

* * * * *